(No Model.) 5 Sheets—Sheet 1.
W. H. LIGHT.
MACHINE FOR MANUFACTURING WASHERS.
No. 437,440. Patented Sept. 30, 1890.
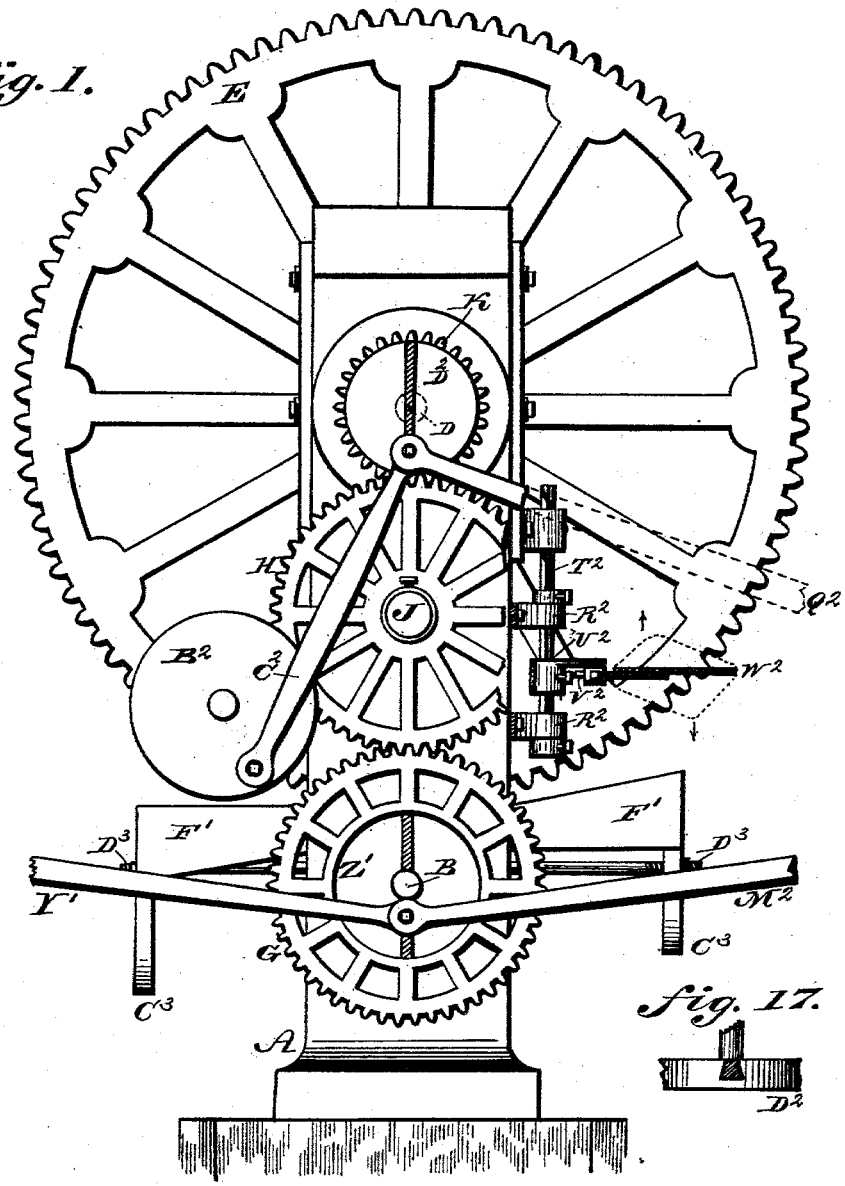
WITNESSES
A. P. Jennings.
L. Druville.
INVENTOR
William H. Light
by John A. Wiedersheim
Associate Attorney.

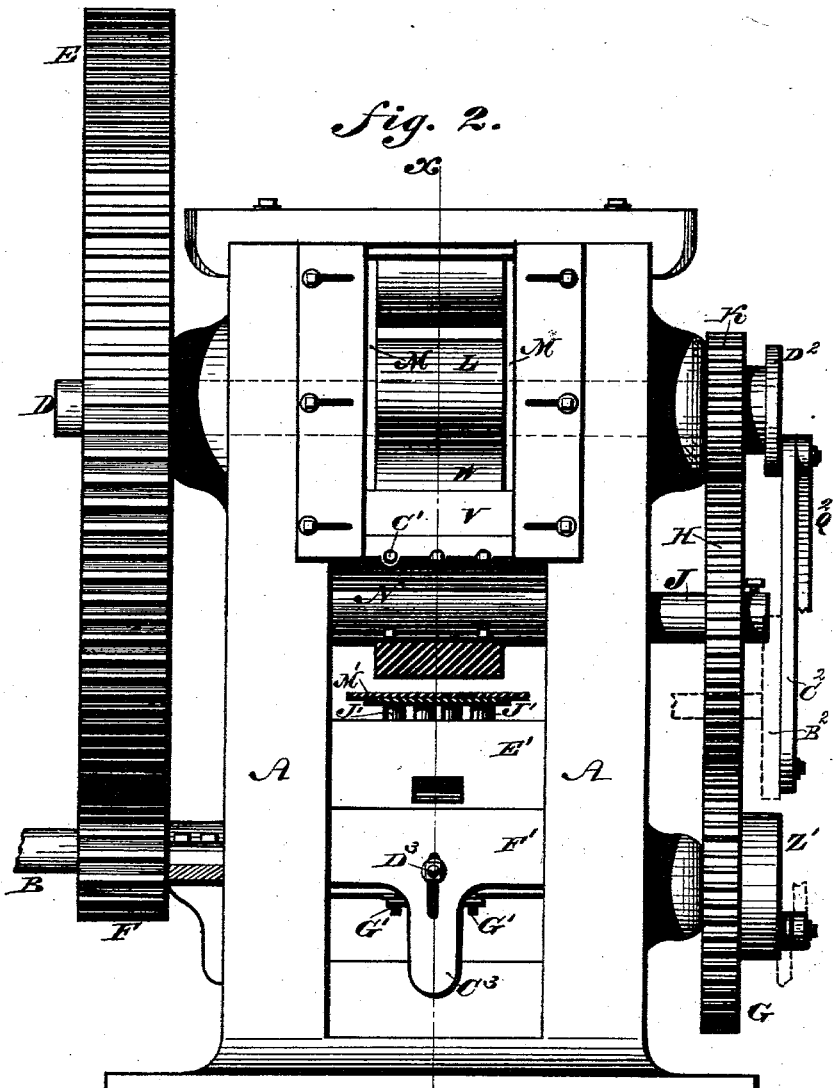

(No Model.) 5 Sheets—Sheet 3.
W. H. LIGHT.
MACHINE FOR MANUFACTURING WASHERS.
No. 437,440. Patented Sept. 30, 1890.
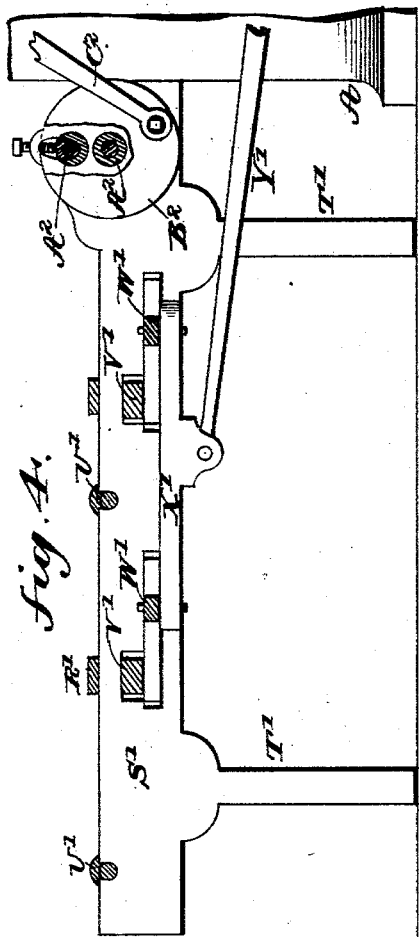
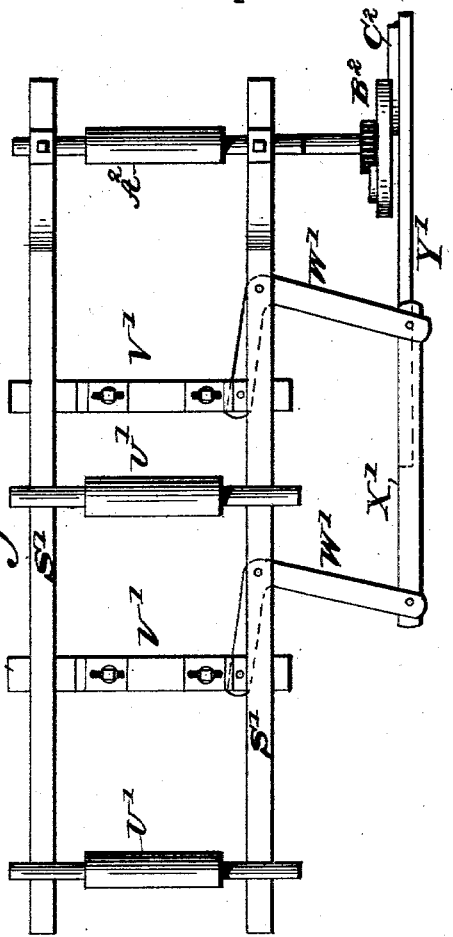
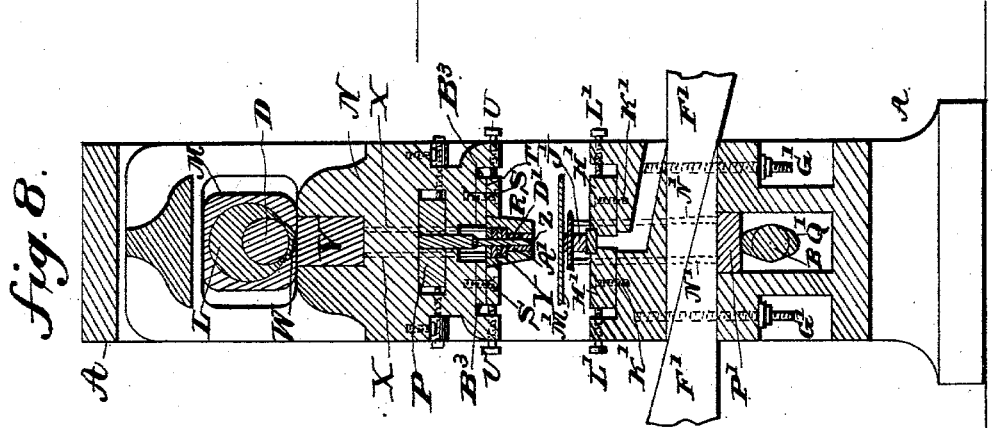
WITNESSES
A. P. Jennings.
L. Jennings.
INVENTOR.
William H. Light,
by John A. Wiedersheim
Attorney (No Model.) 5 Sheets—Sheet 4.
W. H. LIGHT.
MACHINE FOR MANUFACTURING WASHERS.
No. 437,440. Patented Sept. 30, 1890.
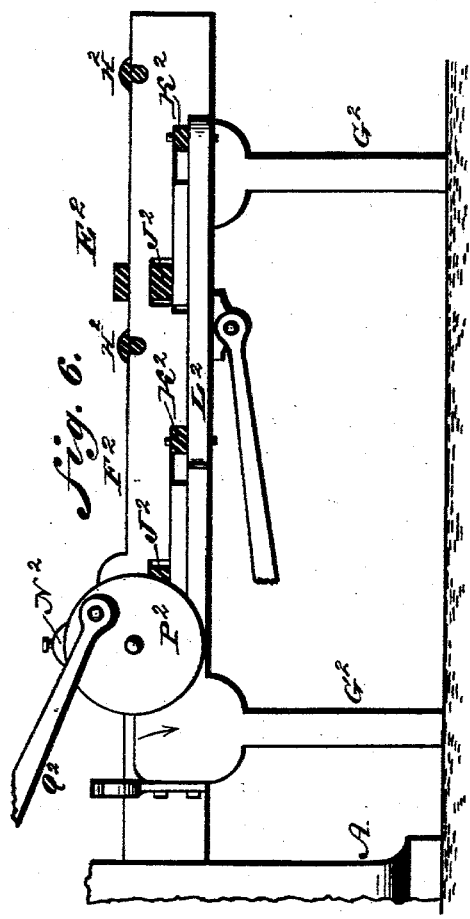
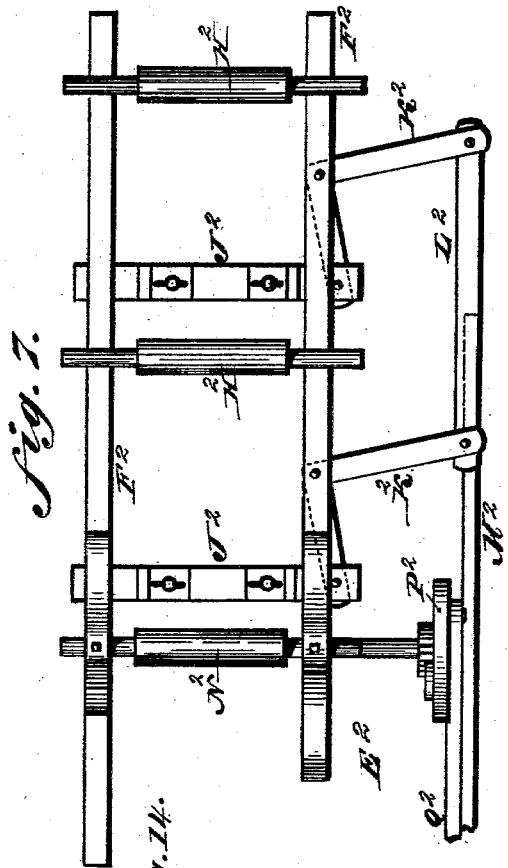
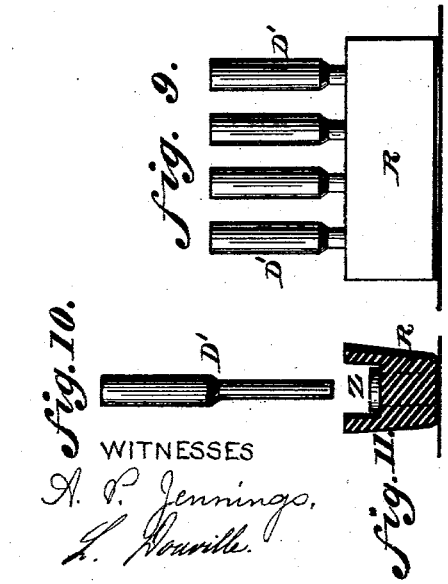
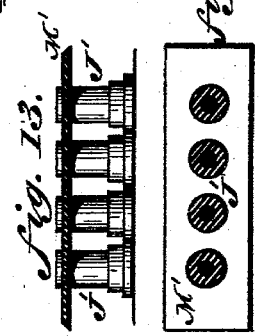
WITNESSES
A. P. Jennings.
L. Douville.
INVENTOR
William H. Light.
by Joshua Biedersheim
Associate Attorney.

(No Model.) 5 Sheets—Sheet 5.
W. H. LIGHT.
MACHINE FOR MANUFACTURING WASHERS.
No. 437,440. Patented Sept. 30, 1890.
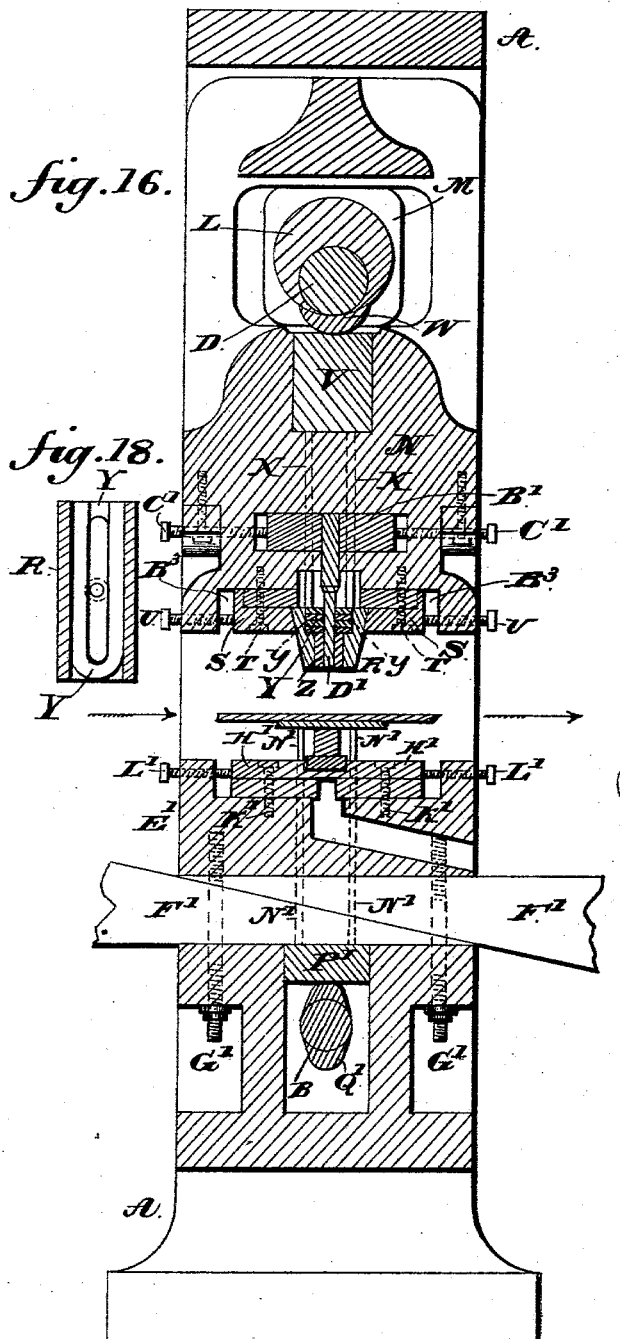
WITNESSES
A. P. Jennings
L. Jennings
INVENTOR
William H. Light
by John All Oberheim
Attorney

UNITED STATES PATENT OFFICE.

WILLIAM H. LIGHT, OF LEBANON, PENNSYLVANIA.

MACHINE FOR MANUFACTURING WASHERS.

SPECIFICATION forming part of Letters Patent No. 437,440, dated September 30, 1890.

Application filed May 27, 1890. Serial No. 353,401. (No model.)

*To all whom it may concern:*

Be it known that I, WILLIAM H. LIGHT, a citizen of the United States, residing at Lebanon, in the county of Lebanon, State of Pennsylvania, have invented a new and useful Improvement in Machines for Manufacturing Washers, which improvement is fully set forth in the following specification and accompanying drawings.

My invention relates to improvements in machines for manufacturing washers, and has for its object a machine whereby a washer may be cut at a single operation, and also a number of similar or different sizes may be produced at the same operation.

A further object is to provide a feeding device to present the washer-plates to the dies.

For these purposes the invention consists of mechanism, substantially as hereinafter described, whereby the washer is formed at a single operation.

It also consists of mechanism for presenting the washer-plate to the action of the dies, so that each successive part is in advance of and to the side of the part previously operated on.

It further consists of a waste-table with mechanism, substantially as hereinafter described, for removing the plates after the washers are cut therefrom.

It also consists of a removing-tray with a tilting device therefor, and, finally, of the combination of parts, hereinafter described.

Figure 1 represents a front view of a machine embodying my invention, the feeding-table thereof being omitted. Fig. 2 represents a partial end view and a partial sectional view, in elevation, of the parts shown in Fig. 1. Fig. 3 represents a view in elevation of the end of the driving-shaft with wheel and pulley. Fig. 4 represents a side view of the feeding-table. Fig. 5 represents a plan view thereof. Fig. 6 represents a side view of the waste-table. Fig. 7 represents a plan view thereof. Fig. 8 represents a vertical section on line $xx$, Fig. 2. Fig. 9 represents a side view of the upper central punches with upper-die seat. Fig. 10 represents a side view of a central punch or upper die. Fig. 11 represents a section in elevation of the upper-die seat and a discharger. Fig. 12 represents a side view of a discharger partly broken away to show a portion of the interior at the lower end thereof. Fig. 13 represents a side view of the lower dies with the stripper. Fig. 14 represents a plan view of the parts shown in Fig. 13. Fig. 15 represents a bottom view of the lower dies. Fig. 16 represents a vertical section on line $xx$, Fig. 2, on an enlarged scale. Fig. 17 represents a sectional view showing the dovetail slot in the crank-wheels for adjustable connection of the pitmen. Fig. 18 represents a horizontal cross-section on line $yy$, Fig. 16. Fig. 19 represents a section of one of the standards and head with rod and tray, the said tray being in section. Fig. 20 represents a plan view of the tray-support and the tilting device therefor. Fig. 21 represents a sectional view, in elevation, of the tray-bearer and a side view of the tilting device.

Similar letters of reference indicate corresponding parts in the several figures.

Referring to the drawings, A A designate standards having mounted in suitable bearings thereon a driving-shaft B, which receives power by means of a pulley C from any suitable motor.

In the upper part of the standards A is mounted a shaft D, with which is connected a gear-wheel E, which meshes with a pinion or gear-wheel F on the shaft B.

On the shaft B, opposite to the pinion F, is mounted a gear-wheel G, with which meshes a gear-wheel H, the latter being on the shaft J and meshing with a gear-wheel K, loosely mounted on the shaft D.

On the shaft D is secured an eccentric L, which works in a sliding box M of the head N, so as to raise and lower the said head.

An upper-die seat R is firmly secured to the under side of the head N by means of the plates S and the screws T and U.

Movably fitted in the head N is a block V, adapted to be in contact at a portion of the revolution of the shaft D with a cam W on the eccentric L. The said block V has the depending pins or rods X bearing on the liners Y, which are formed of slotted strips of metal and are located on the heads of the dischargers Z within a recess in the upper part of the die-seat R, the body portions of said dischargers Z being within the openings A' of the die-seat and having their lower ends beveled on both sides, as shown in Fig. 12.

In a recess formed in the head N are located the central-punch holders B', having serrated or roughened inner faces for grasping the upper ends of the punches, and being held in place by the screws C'. Each of the central punches D' is tapering at its lower end for convenience in operation, and the said punches are embraced by the liners Y and the dischargers Z, as shown.

The lower portion of the head N is provided with a recess B³, located above the recessed portion of the die-seat, so as to allow movement of the dischargers and liners on the central punches.

The lower chuck E' is vertically adjustable in the standards by means of the wedge-shaped keys F', which latter are slotted on their contact inner ends, receiving the screws G', which pass through a portion of the frame of the device connected with the standards A and into the said chuck, and have depending arm C³ at their outer ends, through which pass the rods D³, secured to the standards A and provided with screw-threaded ends for clamping-nuts.

In the upper portion of the lower chuck E' are the plates or blocks H', forming a seat for the lower dies J', and in which the same are adjustably secured by means of the screws K' L'.

Embracing the lower dies near the upper ends thereof is a stripper-plate M', provided with the depending pins N', which pass through openings in the plates H', the chuck E', and the adjusting-keys F' and bear on a rising and falling plate or block P', which is raised and lowered by the rotation of a cam Q' on the shaft B.

In front of the standards A is a feed-table R', consisting of the side rails S' with their supports T' and provided with the rollers U', journaled in said side rails and extending above the top of the same. Loosely fitting in slots in the said side rails S' are the ends of the bars V', having adjustable guide-pieces thereon, which extend above the rail, so as to sustain, in connection with the rollers U', the washer-plates.

Pivoted to one end of each of the bars V' is an elbow-lever W', which latter is pivoted at its angle to one of the side rails. A bar X' connects the outer ends of the said elbow-levers, so that their motion, which is rocking or zigzag, will be simultaneous when operated by the rod Y', pivotally connected with the said bar X' and eccentrically with the wheel Z', secured to the gear-wheel G of the driving-shaft B.

At the inner end of the table R' are two parallel rollers A² A²—an upper and a lower one—between which the washer-plates pass, and which, in connection with two similar rollers on the waste-table in the rear of the standards, keep the said washer-plates in fixed position while the washers are being cut therefrom. The ends of the upper one of said rollers A² A² have springs bearing thereon, so that the distance between said rollers may be automatically adjusted for different thicknesses of plate, and on the shaft of the lower roller is loosely mounted the wheel B², having the rod C² connected therewith and with the wheel D² of the gear-wheel K on the shaft D, a pawl on the said wheel B² engaging a ratchet-wheel secured to the said shaft, rotating the latter.

In rear of the standards A is a waste-table E², consisting of the side rails F² and supports G² and provided with the rollers H² and the bars J², the latter having adjustable guide-pieces, and are pivotally connected by the pivoted elbow-levers K² with a bar L², which is pivotally secured to a rod M², eccentrically connected at one end with the wheel Z', fastened to the gear-wheel G. The inner pair of rollers N² on the waste-table serve, as has been stated, in connection with the rollers A² A², to keep the washer-plate steady and in place while the washers are being cut therefrom.

On the extended journal of the lower one of the rollers N² is loosely mounted a wheel P², which is secured to a pitman Q², pivoted at its other end to the wheel D². The wheel P² carries a pawl, which meshes with a ratchet-wheel on the extended journal of the lower roller, so as to rotate the said roller.

The wheels Z' and D² are provided with dovetail diametric grooves for readily adjusting the securing-pin of the pitmen or rods Y' and M² and the rods C² and Q².

Secured to one of the standards A A are the brackets R², and to the head N is an arm S², with a boss or opening at its end for bearings for a vertical rod T², having bearing-collars secured thereon, and a spiral groove in its upper end to receive a projection on the inner wall of the opening in the boss of the arm S², so as to oscillate the said rod T² when the head is lowered and raised.

Attached to the rod T² is a socket U², adapted to contain the arm or bearer V² of the tray W².

On the side of one of the rails of the waste-table is a tilting device formed of an inclined arm Y², with which the bearer V² of the tray comes in contact as the same is oscillated, so that the said tray is tilted.

The operation of the device is as follows: The washer-plates are placed on the rollers and guide-bars of the feeding-table R', and motion being imparted to the driving-shaft R the bars V' are so moved by the oscillation of the levers W', rod Y', and wheel Z' as to advance the said washer-plates in a zig-zag manner or from side to side, so as to successively present to the cutting-dies a face in advance and to the right or left alternately of the preceding face presented, whereby a less advance of the plate is required at each operation of the dies, and thus an economy in the use of material is effected. The movement of the wheel B² and the contact of its pawl with the pinion of the lower roller-shaft rotates the latter, and so draws the washer-plates between said rollers. The gearing of the machine is so timed that when a new or uncut face is presented beneath the upper-die seat, the head N is forced down by the rotation of the shaft D and eccentric L, so as to cause the sliding box M to lower, and thereby the die-seat, with the discharger and the central punch having their lower edges substantially on the same plane, to come in contact with the washer-plates and bear against the same, which rest on the top of the lower dies. The lower ends of the central punches or dies and the upper-die seat are forced below the top of the lower dies, so that the die-seat receives and embraces the tops of the said lower dies, the part of the washer-plate below said die-seat and central punches being separated or cut from the part between the top of the lower dies and the lower end of the dischargers, which latter, owing to the movable block V, rest on the washer-plate and are not forced downward. The head now rises and at the same time the stripper M', actuated by the block P' and the cam Q', also rises, so as to remove the washer-plate from the lower dies, each piece of material removed from the washer-plate by a central punch falling into an opening and passing out of the chute Z² in the lower chuck. As the head N is raised the tray is brought beneath the upper-die seat by the oscillation of the rod T², the block V being held depressed by the cam W, so that the washers are removed from between the central punch and upper-die seat by the dischargers Z and fall on the tray W², which is carried by the oscillation of the said rod T² until its bearer V² contacts with the inclined tilting-arm Y², when said tray is tilted and its contents emptied out at the side of the waste-table. As the bearer is returned the tray resumes its level position, so that it is again in condition to be brought under the die-seat to receive the washers.

It will be seen that a single washer or a number of such, either of the same size or of different sizes, may be cut at a single movement or downward stroke of the head, which operation is of great advantage.

Having thus described my invention, what I claim as new, and desire to secure by Letters Patent, is—

1. In a machine for manufacturing washers, the combination of a movable head having a die-seat and a central punch secured thereto, said punch having its lower end substantially flush with the under side of the die-seat, substantially as described.

2. The combination of standards, a rising and falling head, an upper-die seat connected with said head, a central punch or die secured to said head, and a stationary lower die, substantially as described.

3. The combination of a rising and falling head, an upper-die seat with a series of openings therein, punches or upper dies secured to said head and centrally located in said openings, and stationary lower dies having their upper ends adapted to enter said openings and embrace the lower ends of the punches, substantially as and for the purpose described.

4. The combination of standards, a rising and falling head, an upper-die seat secured to said head and having a series of openings therein, punches secured to said head and centrally located in said openings, and yielding dischargers surrounding said central punches, substantially as and for the purpose described.

5. The combination of standards, a rising and falling head, an upper-die seat secured to said head and having a series of openings therein, central punches in said openings, yielding dischargers seated on said die-seat and embracing the lower ends of said punches, and stationary lower dies, substantially as described.

6. The combination of a rising and falling head, an upper-die seat secured to said head and having a series of openings therein, punches secured to said head and centrally located in said openings, stationary lower dies having their upper ends adapted to be received and embraced by said die-seat, and a rising and falling stripper embracing said lower dies, substantially as described.

7. The combination of standards, a rotary shaft with eccentrics thereon, a cam on said eccentric, a head adapted to be raised or lowered by the rotation of said eccentric, a die-seat with an opening therein, a central punch, said seat and punch being secured to said head, a block vertically movable in said head and provided with pins, and a discharger in said opening of the die-seat and in contact with said pins, said cam being adapted to contact with said block, substantially as and for the purpose described.

8. The combination of standards, a rising and falling head, a die-seat secured to said head and having an opening therein, a punch secured to said head and centrally located in said opening, a discharger in said die-seat, and surrounding the lower end of said punch, a stationary lower die having its upper end adapted to be received in said opening in the die-seat, and embrace the lower end of said punch, and a rising and falling stripper on said lower die, substantially as described.

9. The combination of a standard, a rising and falling head, a die-seat secured to said head and having an opening therein, a punch secured to said head, and centrally located in said opening, a discharger seated in said die-seat and embracing the lower end of said punch, a movable block in said head having depending pins, liners between the discharger and the ends of said pins, and a cam on a rotary shaft, adapted to engage said block, substantially as and for the purpose described.

10. The combination of standards, a stationary lower die, a stripper-plate embracing said die and having depending pins, a rising and falling plate, and a rotary shaft with a cam thereon, substantially as and for the purpose described.

11. The combination of a stationary lower die with central opening, and a support for said die, having an opening with a chute therein, substantially as described.

12. In a machine for manufacturing washers, the combination of standards, a vertically-adjustable chuck, and a stationary lower die secured to said chuck, substantially as described.

13. The combination of standards, a chuck, keys for vertically adjusting said chuck, and lower dies detachably secured to said chuck, substantially as described.

14. The combination of standards, a chuck, keys for vertically adjusting said chuck, a stationary die secured to said chuck, a stripper-plate embracing said die and having depending pins passing through said chuck and keys, a rising and falling plate on which said pins bear, and a rotary shaft with cam, substantially as described.

15. The combination of standards, a chuck, and wedge-shape keys with lapping ends and slots therein for vertically adjusting said chuck, substantially as and for the purpose described.

16. The combination of standards, a rising and falling head with a punch immovably secured thereto, a yielding discharger surrounding the lower end of said punch, and liners on said dischargers and embracing the punches, substantially as described.

17. In a machine for manufacturing washers, a feeding-table having rollers and movable guide-bars thereon, substantially as and for the purpose described.

18. A feeding-table consisting of side rails with supports, rollers journaled in said side rails and extending above the same, bars having their ends in slots in said rails and extending above the said rails, and mechanism, substantially as described, connected with one end of said bar for operating said bars in unison, said parts being combined as stated.

19. A feeding-table having guiding-bars thereon, mechanism, substantially as described, connected with said guiding-bars for operating the same, as described, upper and lower rollers for advancing washer-plates on said bars, and mechanism connected with said rollers for rotating the same at regular intervals, said parts being combined substantially as described.

20. The combination of standards, a rotary shaft journaled in said standards and with a wheel thereon, a pair of rollers on opposite sides of said standards, having suitable bearings, mechanism connected with one of the rollers, shafts of each of said pair of rollers, and the wheel on the rotary shaft of the standard for operating said rollers, substantially as and for the purpose described.

21. A waste-table having mechanism connected therewith, and substantially as described, for advancing the material thereon step by step and in a zigzag direction, substantially as described.

22. The combination of a feed-table, standards, and a waste-table, said feed and waste tables being provided with mechanism, substantially as described, for advancing the washer-plates step by step and in a zigzag direction, substantially as described.

23. A table having side rails, rollers journaled therein, oscillating guiding-bars on said table, pivoted elbow-levers connected with said bars, a rod joining said elbow-levers, a rotary shaft with wheel thereon, and a rod eccentrically pivoted at one end to said wheel and at the other end pivotally connected with the joining-rod of the levers, said parts being combined substantially as described.

24. In a machine for manufacturing washers, a waste-table having a tilting device connected therewith, substantially as described.

25. The combination of a standard with a bracket, a rising and falling head with an arm, a rod journaled in said bracket and having a spiral groove adapted to receive an inner projection in an opening in said arm, and a tray supported on said rod, substantially as described.

26. The combination of a standard, a bracket secured thereto, a rising and falling head with an arm having an opening therein, a rotatable rod journaled in said bracket and opening and having a spiral groove adapted to receive a pin projecting in said opening in the arm, a socket secured to said rod, and a tray with its bearer or arm in said socket, substantially as described.

27. The combination of an oscillating rod with a socket secured thereto, a tray having a supporting arm or bearer in said socket, and a stationary inclined arm adapted to be engaged by said supporting-arm, so as to tilt said tray, substantially as described.

28. The combination of a die-seat, a central punch, and a discharger seated in said die-seat, embracing the lower end of said punch, substantially as and for the purpose described.

29. In a machine for manufacturing washers, a discharger having its lower inner end beveled, substantially as and for the purpose described.

30. In a machine for manufacturing washers, a discharger having its lower ends beveled on both outer and inner sides, substantially as and for the purpose described.

31. A machine for manufacturing washers, consisting of standards with a rising and falling head having secured thereto a die-seat with openings and central punches, stationary lower dies, a feed-table with advancing rollers for the material, mechanism, substantially as described, for imparting intermittent motion to the same, and mechanism, substantially as described, connected with said table for imparting a successive right and left movement to the washer-plates fed to the device, said parts being combined substantially as and for the purpose described.

32. The combination of standards, a chuck adjustable therein, wedge-shaped keys having on their outer ends depending arms, a rod or rods secured to said standards and having threaded outer ends passing through said arms, and nuts on said rods, substantially as and for the purpose described.

33. In a machine for manufacturing washers, a rising and falling head with dies, and an oscillating tray, said parts being combined substantially as described.

34. In a machine for manufacturing washers, the combination of a movable die, a stationary die, and a central punch secured to one of said dies, substantially as described, whereby a washer can be cut at a single operation of the device, as stated.

WILLIAM H. LIGHT.

Witnesses:
S. H. BENTZ,
B. B. LEHMAN.